W. B. KNAPP.
CARPENTER'S BIT.
APPLICATION FILED OCT. 7, 1909.
1,015,446.
Patented Jan. 23, 1912.
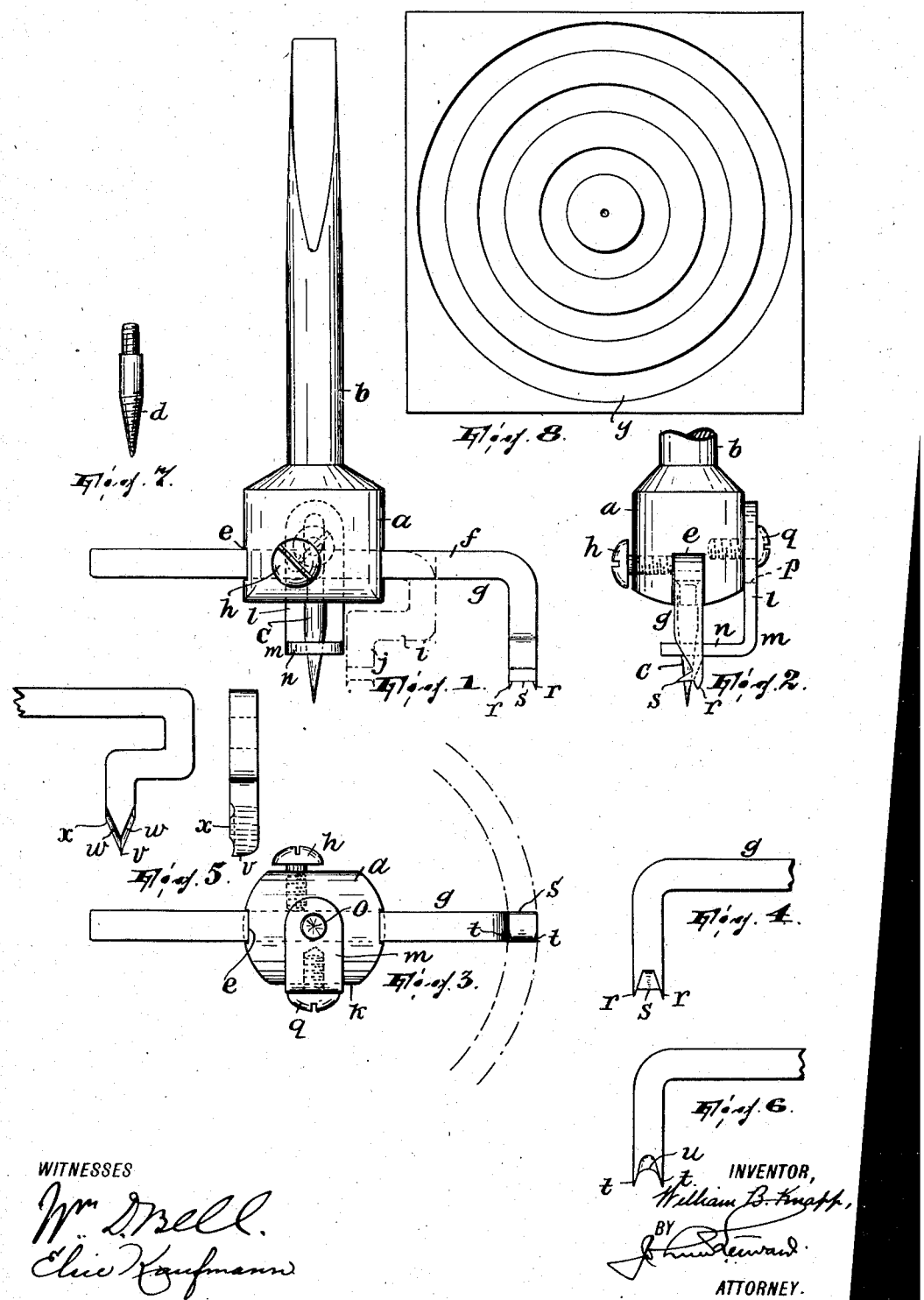
WITNESSES
Wm D Bell
Elise Kaufmann
INVENTOR,
William B. Knapp,
BY
ATTORNEY.

UNITED STATES PATENT OFFICE.

WILLIAM B. KNAPP, OF PATERSON, NEW JERSEY.

CARPENTER'S BIT.

1,015,446. Specification of Letters Patent. Patented Jan. 23, 1912.

Application filed October 7, 1909. Serial No. 521,512.

*To all whom it may concern:*

Be it known that I, WILLIAM B. KNAPP, a citizen of the United States, residing in Paterson, Passaic county, New Jersey, have invented a certain new and useful Improvement in Carpenters' Bits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide means whereby circular grooves or other circular cuts may be effected where it is not convenient or possible to accomplish the same work in a lathe or the like.

In producing a device useful for the purpose indicated above, I have had in mind to make it adapted for producing cuts varying in diameter, as also for quick exchange of cutters where a cut of different form from one previously made is desired.

According to my invention, I provide a stock or holder having a suitable point or centering device, and in said stock, adjustable radially therein, a cutter is set whose working portion projects substantially parallel with the axis of the stock; I also preferably provide the stock with an adjustable stop which, by coming in contact with the work, is adapted to limit the action of the tool and hence determine the depth of the cut. In my effort to produce a practical device of the character thus generally outlined, I have found that for certain classes of work it is necessary that the cutter have its cutting end peculiarly formed, and this not only to reduce the cost of manufacture, but that the cut produced be clean and true and that the device as a whole may be manipulated with facility and with as little torsion and vibration as possible; to this end the cutter has been provided with a cutting end designed to cleave into the work in a more or less upright plane.

In the accompanying drawing, Figure 1 is a front elevation of the improved tool; Fig. 2 a side elevation; Fig. 3 an underneath plan; Fig. 4 a rear elevation of the cutter; Fig. 5 a front and side elevation of another form of the cutter; Fig. 6 a rear elevation of still another form of the cutter; Fig. 7 shows the preferred form of the centering device; and, Fig. 8 is a plan view of a piece of material operated upon by the improved tool.

$a$ designates the stock, the same having an upwardly projecting shank $b$ adapted to be fitted to a brace or the like. In the axial line of the stock there is arranged at its lower end a centering device $c$, which may be either in the form of a plain tapering pin, or in the form of a screw, as at $d$ in Fig. 7. The centering device may be screwed into or otherwise secured in the stock; if screwed therein, its thread is reverse with respect to the direction in which the tool is intended to be turned.

A transverse hole $e$ is formed in the stock, the same being preferably non-circular in cross-section. In this hole is fitted the straight elongated shank $f$ of the cutter $g$, the working end-portion of which cutter is turned off downwardly with respect to its shank so as to stand substantially parallel with the axis of the stock. The cutter is rendered adjustable radially of the stock (that is, in the direction of the length of the shank of the cutter) by virtue of a set-screw $h$ tapped into the stock and adapted to bind against the shank of the cutter. In order to be able to bring the working end of the cutter close to the centering device $c$, said end may be bent first inwardly, as at $i$, and then downwardly, as at $j$ into close proximity to the centering device (see dotted lines in Fig. 1 and see also Fig. 4).

The stock has a vertically flat face $k$ preferably parallel with the shank of the cutter $g$, and against this face is secured the flat shank $l$ of a stop $m$ whose free end $n$ is bent off horizontally and has a hole $o$ receiving the centering device $c$. The shank $l$ of the stop is formed with a vertical slop $p$ through which is passed a screw $q$ which is tapped into the stock and is adapted for securing the stop at any desired elevation. When the tool is used to cut a groove, the stop ultimately impinges against the work and limits the downward movement of the tool; any desired depth of groove may thus be formed by simply adjusting the stop vertically.

Several forms of cutters which may be used are shown in the accompanying drawing, the same being designed to cut different shapes of grooves. For instance, that shown in Figs. 1, 2, 3 and 4 serves to cut a cross-sectionally square groove; that shown in Fig. 5 is designed to cut a V-shaped groove; and that shown in Fig. 6 cuts a groove having a convex rib. In Figs. 1 to 4, the cutter has two vertical downwardly depending ears or edges *r r* which form the margins of the groove, and in advance of said edges a relatively horizontal cutting edge or chisel *s*. When the cutter engages the work, the edges *r r* first cut the marginal portions of the groove and on the next rotation the chisel *s* removes the material between the cuts produced by the edges *r r*. In Fig. 6, the cutting ears or edges *t t* and cutting edge or chisel *u* are the same as the cutting edges *r r* and *s*, respectively, of the cutter shown in Figs. 1 to 4, except that the edge *u* is concave; this cutter operates the same as the cutter shown in Figs. 1 to 4. In Fig. 5, the cutter is tapered to a flat point, as at *v*, and upwardly from said point it has the diverging grooves *w* producing at the outer side of each groove the cutting edge *x*; in the preliminary rotation of the tool, the edge *v* forms a single cut, which is gradually widened by the tapering portion of the cutter immediately above the edge *v*, until finally the edges *x* come into play and cut away the sides of the V-shaped grooves being produced.

It will be understood that I am not limited to any particular form of cutter, as various kinds of cutters may be used according to the style of cut which is to be produced. It is essential, however, in order that the tool may be used with the greatest efficiency in cutting various kinds of material, that the cutter be provided with a cutting edge or edges arranged substantially vertically and adapted to effect a cut preliminary to that performed in giving the ultimate shape to the groove or other cut being made.

Fig. 8 shows how a block of wood, for instance, may be operated upon by my tool so as to produce circular grooves or cuts *y* of any desired diameter.

The end of the stock is shown rounded or part-cylindrical in Fig. 2. The purpose of this is to prevent damage, either by splitting or otherwise, to the wooden block or piece being cut; that is to say, in some cases the stop *l* not being used and being detached, if the end of the stock were flat its broad contact with the block, indicating that the cut had been completed, would be calculated to do the damage indicated before the rotation of the stock could be stopped, as when the latter is fitted in a lathe, for instance. Under the same circumstances, the end of the stock being rounded in the way indicated, it can, in effect, sink itself to a limited extent into the wood without doing greater damage.

Having thus fully described my invention, what I claim as new and desire to secure by Letters Patent is:—

The combination of a rotatable stock, a centering device arranged in one end thereof, a tool having a shank-portion and a cutting-portion projecting angularly from the shank-portion, said tool being arranged in the stock with its shank-portion disposed at a right angle to the axis of rotation of the stock and having the end part thereof comprising its cutting-portion bent first downwardly, then inwardly toward the axis of the stock in a line crossing said axis at right angles and below said end of the stock and then downwardly, substantially as described.

In testimony, that I claim the foregoing, I have hereunto set my hand this 6th day of October, 1909.

WM. B. KNAPP.

Witnesses:
 JOHN W. STEWARD,
 WM. B. BELL.